United States Patent
Grotto

(10) Patent No.: US 8,781,961 B2
(45) Date of Patent: Jul. 15, 2014

(54) CURRENCY CONVERSION WITH PRE-PAID CARD

(75) Inventor: Daniel Grotto, Wheaton, IL (US)

(73) Assignee: Prepaid Solutions, Inc., Atlanta, GA (US)

( * ) Notice: Subject to any disclaimer, the term of this patent is extended or adjusted under 35 U.S.C. 154(b) by 1218 days.

(21) Appl. No.: 12/195,187

(22) Filed: Aug. 20, 2008

(65) Prior Publication Data

US 2010/0049653 A1  Feb. 25, 2010

(51) Int. Cl.
*G06Q 40/00* (2012.01)

(52) U.S. Cl.
USPC .......... 705/41; 705/44; 705/39; 705/14.17; 705/1.1; 705/69

(58) Field of Classification Search
USPC ........... 705/1, 41, 1.1, 39, 44, 14.17, 35, 69; 235/379, 380, 375; 455/406
See application file for complete search history.

(56) References Cited

U.S. PATENT DOCUMENTS

| | | | |
|---|---|---|---|
| 5,025,372 A | 6/1991 | Burton et al. | |
| 5,787,402 A * | 7/1998 | Potter et al. | 705/37 |
| 6,405,182 B1 | 6/2002 | Cuervo | 705/43 |
| 6,488,203 B1 | 12/2002 | Stoutenburg | 235/379 |
| 6,814,282 B2 | 11/2004 | Seifert et al. | 235/379 |
| 6,829,588 B1 | 12/2004 | Stoutenburg et al. | 705/30 |
| 6,829,590 B1 * | 12/2004 | Greener et al. | 705/38 |
| 7,104,440 B2 | 9/2006 | Hansen et al. | 235/379 |
| 7,165,049 B2 * | 1/2007 | Slater | 705/41 |
| 7,229,011 B2 | 6/2007 | Hansen et al. | 235/379 |
| 7,266,533 B2 | 9/2007 | Karas et al. | 706/26 |
| 7,401,049 B2 * | 7/2008 | Hobbs et al. | 705/39 |
| 7,512,552 B2 | 3/2009 | Karas et al. | 705/26 |
| 7,549,575 B2 | 6/2009 | Hansen et al. | 235/379 |
| 7,578,434 B2 | 8/2009 | Hansen et al. | 235/379 |
| 7,588,180 B1 | 9/2009 | Carmichael et al. | 235/379 |
| 7,613,653 B2 | 11/2009 | Milberger et al. | 705/39 |
| 2001/0001856 A1 | 5/2001 | Gould et al. | 705/39 |
| 2003/0053609 A1 | 3/2003 | Risafi | 379/114.2 |
| 2003/0200179 A1 | 10/2003 | Kwan | 705/65 |
| 2005/0177496 A1 | 8/2005 | Blagg et al. | 705/39 |
| 2008/0035723 A1 | 2/2008 | Hansen et al. | 235/379 |
| 2008/0162350 A1 | 7/2008 | Allen-Rouman et al. | 705/44 |
| 2008/0195485 A1 * | 8/2008 | Kennedy | 705/14 |
| 2009/0089209 A1 | 4/2009 | Bixler et al. | 705/40 |
| 2009/0182648 A1 | 7/2009 | Karas et al. | 705/27 |

OTHER PUBLICATIONS https://www.chase.com/ccp/index.jsp?pg_name=ccpmapp/smallbusiness/payments_payroll/page/foreign_exchange, last retrieved on Nov. 20, 2009.

(Continued)

*Primary Examiner* — John H Holly
(74) *Attorney, Agent, or Firm* — Smith, Gambrell & Russell

(57) ABSTRACT

A system is provided for a stored-value card account to serve as a platform to transfer funds in alternate currency. A prepaid cardholder may transfer to a recipient in a first currency from an account in a second currency. The prepaid cardholder selects the amount to be transferred, the recipient, and the currency to be provided to the recipient. An exchange rate is obtained automatically from a currency exchanger and once the prepaid cardholder authorizes the transfer, funds in the requested currency are transferred to the recipient and the prepaid cardholder account owner's prepaid cardholder account is debited the appropriate amount. Thus, currency conversion and delivery to a recipient is possible in an automated process.

20 Claims, 6 Drawing Sheets

(56) References Cited

OTHER PUBLICATIONS https://www.accountnow.com/services/how-it-works.aspx, last retrieved on Nov. 20, 2009.

https://wumt.westernunion.com/WUCOMWEB/staticMid.do?method=load&countryCode=US&languageCode=en&pagename=osMoneyTransferOptions&src=gg_US_brand_eng, last retreived on Nov. 20, 2009.

* cited by examiner

700

User Identification

Password

Exchange Services

Activate Card

Prior Transactions

Change Pin

View Statement

Fig. 8

CURRENCY CONVERSION WITH PRE-PAID CARD

BACKGROUND

1. Field of the Invention

The present invention relates to field of providing funds in alternative currency, and specifically relates to currency conversion of funds transferred from a stored-value card account.

2. Description of Related Art

One issue with the globalization of business is that individuals involved in global business relationships frequently need to convert funds from one currency to another currency. In some settings, large companies can afford to use dedicated traders and derivatives to ensure that they obtain a relatively favorable exchange rate. Smaller businesses and individuals, however, find the issue of converting funds from one currency to another currency relatively problematic. Certain banks and providers offer currency exchange services to help businesses or individuals, but the services are typically manual and less flexible than desired.

For example, maritime employees are in many cases required to receive payroll payment in cash in one currency while working on a ship, but often desire to provide the funds to a recipient in a different currency. Major cruise ship providers have payrolls in the hundreds of millions of dollars for thousands of employees that must be paid in cash on a regular basis. This may involve distribution of a large amount of cash to each ship, which is then distributed to ship's employees. The employees can then go to shore and convert the funds into a desired currency at local currency exchanges and/or transfer the funds to a location or bank accounts in other parts of the world.

Naturally, this is highly inconvenient for the employees and risky because it is known that ship personnel are likely to be carrying cash when leaving the ship, potentially creating a risk of theft and harm to the personnel as they convert and transfer their money. In addition, the currency exchange rate is usually unfavorable because of charges or rates applied by the currency exchanger. This situation is also undesirable for the cruise ship operators because they want to ensure the safety of their employees. Furthermore, ensuring sufficient cash is available to pay employees is expensive and logistically complicated.

Related problems exist for companies doing business over the Internet, or otherwise seeking to conduct transactions, such as providing pre-paid cards for a reward or rebate program worldwide or in multiple countries. A company located in India, for example, might decide to distribute products in the United States via a third party infrastructure. The third party would receive payments in United States dollars (USD) but would need to provide funds to the company in Rupees. Conventional processes involve sending a check in USD to the company in India, which would then deposit the check in a local bank. The company in India would then have to wait an extended period of time for the check to clear, and typically may receive a relatively unfavorable exchange rate. Conversely, any funds distributed for a rebate or reward payment by a domestic company to foreign individuals face complicated transaction bookkeeping and possible increased currency risk. Further, a foreign recipient of a stored-value card from a U.S. company faces similar difficulty or unfavorable exchange rate with conventional payroll, rebate or reward fund transfer. Such issues often increase the cost of transactions and undesirably affect business owners that would otherwise be well suited to provide desired worldwide goods and services.

Therefore, improvements in converting funds from a first currency to a second currency would be appreciated.

SUMMARY

In an embodiment, a system is provided for a prepaid cardholder to make a transfer to a recipient in a first currency from a prepaid cardholder account in a second currency. The prepaid cardholder selects the amount to be transferred, the recipient, and the currency to be provided to the recipient. An exchange rate is obtained by the prepaid account issuer automatically via the web from a currency exchanger and, once the prepaid cardholder authorizes the transfer, funds in the requested currency are transferred to the recipient and the prepaid cardholder account owner's prepaid cardholder account is debited the appropriate amount as determined by the prepaid account issuer. Thus, the present invention utilizes a pre-paid card account that functions as a platform for transferring funds, such as payments, in alternate currency for business-to-business transactions or personal transfer of funds and/or bill payments.

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which:

FIG. 7 illustrates a login screen that may be used to verify the identity of an account owner.

FIG. 8 illustrates a home page that may be used to provide desired functionality to an account owner.

DETAILED DESCRIPTION

Figure 1:
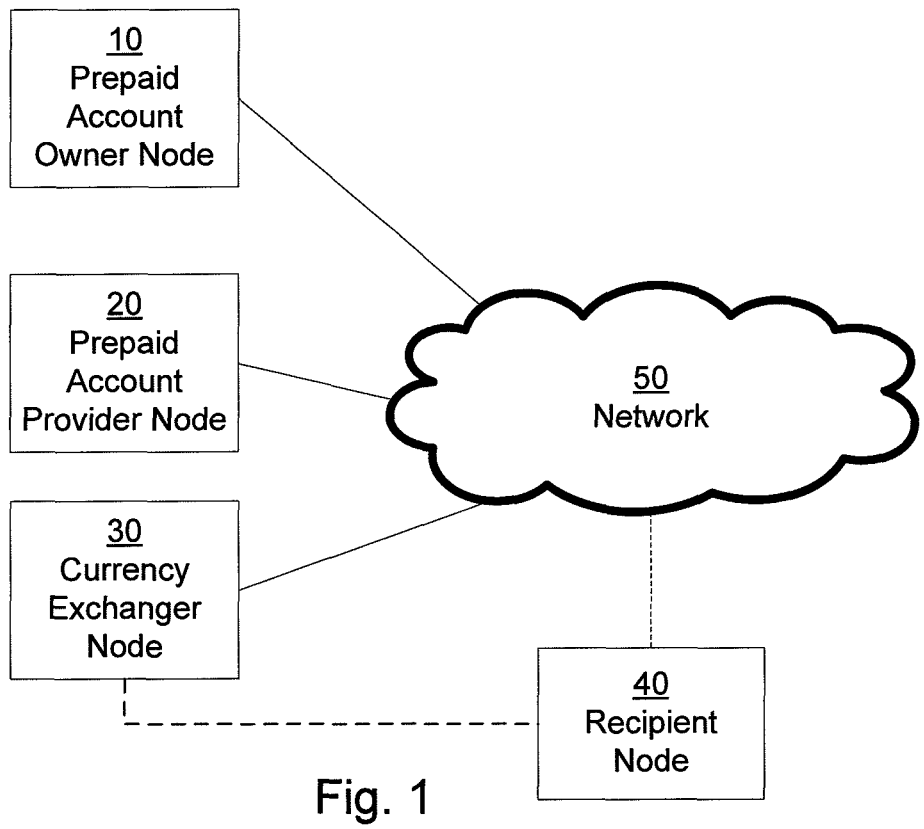
FIG. 1 illustrates a schematic of a system that may be used to implement one or more aspects of the present invention.

Currency fluctuates by minute and over time, based on changing global economic conditions and events. Converting a balance from one currency to another can, therefore, be useful in the global economy. To aid in currency conversion, currency exchange rates are tracked on a global basis and the current exchange rate for converting between two currencies is referred to as the spot exchange rate. For example, if the spot exchange rate is 1.5644 United States dollars (USD) per 1.0000 Euro, a currency trader might buy Euros in the hope that the USD weakened and the spot exchange rate changed to 1.6000 USD per 1.0000 Euro. At that point the currency trader might use the Euros to buy dollars and hope that the dollar strengthened to something like 1.5000 USD to 1.000 Euros. This buying and selling of currencies goes on continuously and, by buying other currencies (either outright or with the use of future contracts), the risk of a potential future changes in the currency exchange rate may be mitigated.

Unfortunately, for most individuals it is not possible to obtain an exchange rate at or close to the spot exchange rate; instead, an individual converting between currencies must pay a significant spread of difference between the spot rate and the provided rate. Indeed, it is relatively difficult to obtain an exchange rate with a spread of less than 6.5-10 percent in most situations. For example, if the spot exchange rate was 1.5000 USD per 1.000 Euro, an individual trying to buy Euros with dollars from a typical currency exchanger might have to pay 1.600 USD per 1.000 Euro (a spread of almost 7 percent– (1.6–1.5)/1.5=6.67% spread) while at the same time only receiving 1.4000 USD for each Euro being sold. This spread allows the currency exchanger to pay for the conversion process. In addition, many of the institutions that provide a currency conversion service do not perform the process of converting funds frequently, and thus charge a larger spread to cover cost and the potential risk of a currency rate change occurring before the conversion is completed. Furthermore, if a person is trying to convert from one hard currency (USD, for example) to another (RMD, for example), the currency exchanger must store both currencies locally. Therefore, facilities dedicated to currency exchange charge a larger spread than that which is desirable for a person attempting to convert funds. Thus, converting money from one currency to another tends to be relatively expensive. In addition, many institutions charge substantial fees to create drafts in foreign currencies, thus smaller companies and individuals attempting to do business on a global scale are left with substantial currency exchange issues in addition to the ever-present concern that the exchange rate might change in an unfavorable manner due to market conditions.

For example, a supplier from India might purchase components from China and sell the finished goods in the United States. Payment in USD would need to be converted to rupees (INR) and then converted to renminbi (RMB) so that everyone was paid. To avoid multiple exchanges, it would more efficient to directly convert the USD directly to INR and RMB in appropriate amounts. Thus, for example, to minimize loss due to currency conversion, the Indian supplier, if paid in USD, could have some of the USD converted to RMB and provided directly to the Chinese component supplier while receiving the balance in INR.

Turning to FIG. 1, an exemplary system is disclosed that may be used in accordance with one or more embodiments of the present invention. In this embodiment, a prepaid card account is essentially a stored-value card balance, in the form such as a general spend card account, a payroll card account, a gift card, or a reward/rebate card account. As depicted, a prepaid card holder node 10, a prepaid card account issuer/manager node 20, a currency exchanger node 30 and a recipient node 40 are all in communication with a network 50. In an embodiment the network may be a single continuous network (such as the Internet) composed of a number of interconnected communication paths. In an alternative embodiment, dedicated communication networks may be provided to link certain nodes. Thus, the depicted network 50 is a logical network that could be formed of a number of separate networks. Furthermore, it should be noted that depending on the system configuration, the functionality of two nodes could be combined into a single node. For example, the prepaid card account manager node 20 and the currency exchanger node 30 could be combined to form a single node.

Regardless of such variation of the configuration depicted in FIG. 1, it should be recognized that the present invention utilizes a prepaid card, as a stored-value card account of funds, which is in distinction from a bank account. This distinction is very important, as the present invention utilizes the functionality of the pre-paid card platform, whether it is a general spend prepaid card, a payroll prepaid card, a gift card, a corporate reward prepaid card account or a rebate-type prepaid card. Further, the present invention utilizes the prepaid card functionality as a platform for such transactions, regardless of whether the prepaid card account utilizes an actual card, or is simply a "virtual-card" whereby no actual plastic card is needed for transfer of an amount of the prepaid-card account balance. This is what is meant by the terms "prepaid account" or "stored value card account" herein, and should be recognized as in direct distinction from traditional bank accounts, such as a bank savings account or a checking account. Importantly, such traditional types of accounts, such as a bank savings account or checking account, include aspects that may limit or restrict one from certain types of transactions. Such problems with bank accounts may be avoided or rendered inapplicable when utilizing the present invention, which provides a versatile platform for international business and bill payment with currency exchange of funds.

As depicted, the recipient node 40 is shown with a dotted line connected it to the network 50 and the currency exchanger node 30. Only one line of communication is needed, however both may be present if desired. In an embodiment, the communication channel directly between the currency exchanger node 30 and the recipient node 40 may be a separate network or may be provide via a mail service. For example, if a draft was being provided to the recipient node 40, it could be sent via a mail carrier from the currency exchanger node 30 to the recipient node 40. Thus, an electronic connection between the network 50 and the recipient node 40 is not required. However, if the recipient node 40 is a bank or represents an online prepaid cardholder account of an individual then it is possible that a communication link with a network is present and such a communication link may be used to transfer finds electronically between the currency exchanger node 30 and the recipient node 40. It should also be noted that, in an embodiment, two or more of the depicted nodes may be combined. In an embodiment, the prepaid cardholder could have multiple accounts, each in a different currency, and the prepaid card program manager node and the recipient node may be the same. In another embodiment, the prepaid card program manager node and the currency exchanger could be combined. Thus, the depicted configuration in FIG. 1 may be modified as appropriate, and yet still practice the present invention.

Figure 2:
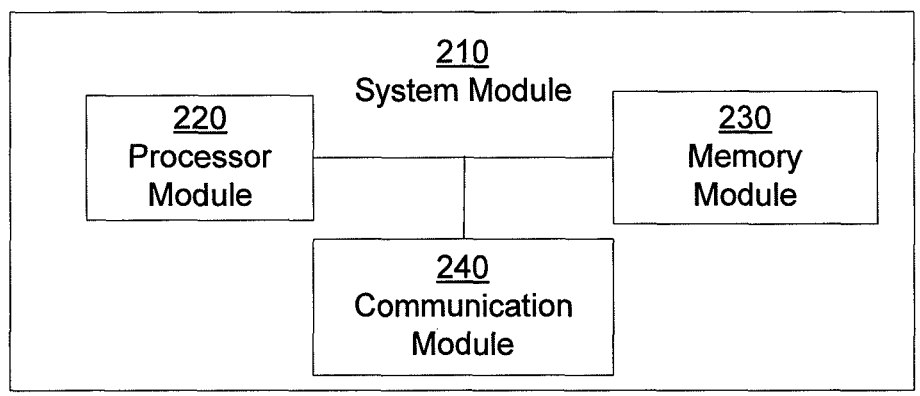
FIG. 2 illustrates a schematic of a system module that may be used as a node in the system depicted in FIG. 1.

FIG. 2 illustrates a schematic of an exemplary system for use in receiving and providing electronic requests. A system module 210 includes a processor module 220, a memory module 230 and a communication module 240. Each module may include local and remote resources, as appropriate, and may be configured in a desirable manner. For example, the processor module 220 may include one or more logical processors configured to carry out instructions stored in computer memory. The memory module 230 may be any desirable memory type (volatile or non-volatile, random or sequential access) or a combination of types and in general includes instructions on computer readable media that to cause the processor to function in a desired manner. The communication module 240 may include one or more ports to interface with a network, such as wired ports or wireless ports (e.g., an antenna). It should be noted that the system module 210 is shown a single component, however it is also envisioned that one or more components of the system may be provided via an array of components that are local and/or remote. Therefore, the depicted system module 210 is a logical representation of an exemplary system that may be used as the hardware for one or more of the nodes in FIG. 1.

It should be noted that improvements in technology have made it possible to perform more functions over networks that may be wired and/or wireless, and that can span wide geographical regions, including functions performed over the Internet. Thus, in the embodiments discussed herein, it should be understood that the nodes used may be accessed via a wireless or wired manner via any desirable protocol (e.g., 3G, 4G, Ethernet, etc.). Furthermore, the availability of widespread networks also allows for the user of server farms and distributed computing, thus it is contemplated that computing system could be located in a single location (such as a single CPU server) or could be an array of servers with multiple CPUs distributed over a number of locations, or some other combination of processors in communication with each other. Accordingly, unless otherwise noted, this disclosure is not intended to be limiting in this respect.

Figure 3:
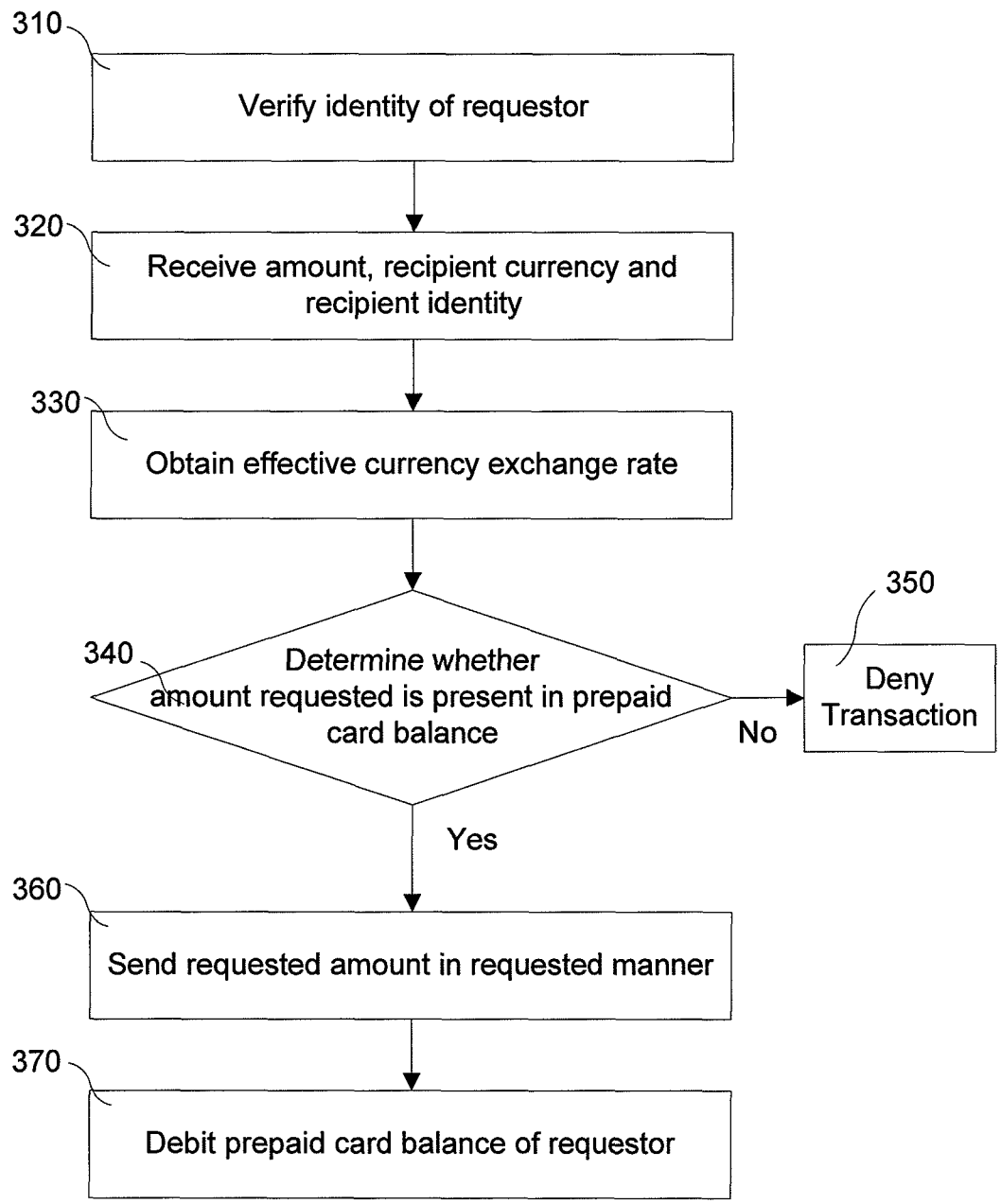
FIG. 3 illustrates a process of providing a requested amount in a requested manner to a requested recipient.

FIG. 3 illustrate some aspects of a method of providing a balance in a first currency to a recipient from a prepaid cardholder account where the money is being stored in a second currency. First in step 310, an identity of a requester is verified. This is usually in response to a prepaid card holder logging into a website associated with the prepaid cardholder account holder's account. A simplified login screen 700 that can be provided via a web browser is shown in FIG. 7. As is known, the user can enter the information in prepaid cardholder node 10, which, as noted above, may be any appropriate computing system, and the information is transmitted electronically to prepaid card program manager node 20. As is typical, the information transmitted includes something such as a user name and a password to verify that the person requesting access is the prepaid cardholder account owner. To help ensure the transmission is secure, before any information is transmitted the communication connection can be made secure in a conventional manner, such as by data encryption. Once the prepaid cardholder enters the information on the prepaid cardholder node 10, it is submitted and provided to the prepaid card program manager node 20 via the network 50. The user identification and password are compared to information previously stored to determine whether the requester should be granted access. If the user identification represents a valid user identification associated with a prepaid cardholder account and the password matches the expected password, the requester is considered verified/identified and is then granted access to the associated prepaid cardholder account information.

It should be noted that in place of a standard login process, the user may be required to submit biometric information (such as a fingerprint scan or a retina scan or the like), alone or in combination with some pass code. In general, requiring a two factor verification process (such as requiring something the user has and the user knows) is beneficial from a fraud prevention standpoint but is detrimental from an ease of use standpoint. Thus, increasing the reliability of the login will generally reduce fraud and potentially increase user inconvenience. Thus a balance between these two competing interests may be considered when customizing a given account procedure or protocol for information access.

Once the user's identification is verified, the user can be provided a home web page (such as home page 800 as shown in FIG. 8). From the home web page, the user can typically select the prepaid cardholder account the user would like to view (if the user has multiple accounts) or see a list of prior transactions. The user can also select actions the user would like to perform, such as activating a card, view a statement of activity or prepaid account balance or exchange currencies (the Exchange Services selection in FIG. 8).

Upon selection of the currency exchange services, the user selects an amount to be transferred, a currency that the money should be converted into, and the identity of the recipient in step 320. The recipient may be a different prepaid cardholder account with the same prepaid cardholder account provider, a prepaid cardholder account (with a different prepaid card program manager) that is owned by the prepaid cardholder or someone else, or it may be an individual at a particular address. It should be noted that the recipient may be selected from a list of stored recipients or the recipient may be newly-identified by appropriate information input by the prepaid account owner.

Next in step 330, a currency exchange rate is obtained from a currency exchanger (such as currency exchanger node 30 in FIG. 1). To cover the costs associated with converting from one currency to another, the obtained exchange rate can be adjusted by a spread necessary to cover the currency exchange process. However, preferably the total spread is small (such as less than 4 or 5 percent), so as to minimize the cost to convert funds. This favorable rate would normally be difficult or impossible to obtain for an individual at a currency exchange desk, typically at a higher rate due to the risks involved for the party converting the funds and the lower amount of funds involved. The preferred lower rate of the present system, in distinction, is achieved due to economies of scale and the methodology disclosed herein.

In particular, when a request for an exchange rate is made to the currency exchanger, the currency exchanger automatically identifies the actual or average spot exchange rate on the currency trading market at that time. The currency exchanger typically includes the functionality of actively making trade in currencies in relatively larger dollar amounts and therefore is more likely to obtain an exchange rate substantially similar to the spot exchange rate. Further, when a request for a currency exchange rate between two currencies is received, the currency exchanger knows is likely to have available reliable information regarding the current currency exchange rate and can provide it automatically.

The currency exchange rate the currency exchanger provides also includes a spread to cover the cost of making the transaction. Because the currency exchanger is efficient in making currency trades, the spread required to cover the cost of the transaction can be low. In an embodiment, the spread the currency exchanger charges can vary with the dollar amount and range from about 1 percent to about $\frac{3}{8}$ percent. The prepaid card program manager (at 20 in FIG. 1) may also charge a fixed fee or fixed spread at some predetermined level. Regardless, the total cost to convert the currency will be substantially lower than an individual would typically obtain when trading currency at a currency exchange desk (of a local bank or currency exchanger found in international locations). This is, in part, because the entire conversion process from one currency in a prepaid cardholder account to a second currency being delivered to a recipient may be performed automatically without human intervention, thus greatly lowering the cost of converting between currencies.

It should be noted that the request for a transfer of funds to a recipient may be made in the currency desired to be provided to the recipient. For example, in an embodiment the prepaid cardholder could indicate a transaction whereby 210.50 Euros should be delivered to a recipient in a desired manner (electronic transfer, draft, etc.). In such an embodiment, the cost to provide the 210.50 Euros to the recipient would be calculated (the costs could vary depending on the amount and method of delivery, for example, and the current spot exchange rate). The prepaid cardholder could then be informed of the effective exchange rate (based on the total costs including the spread) or be given a breakdown of the exchange rate (with the spread) as well as any line item costs (such as a delivery charge, etc.). The level of detail could also be modified depending on the prepaid cardholder preference. For example, a business owner might prefer to see the details of the cost listed out so as to determine whether they were better off transferring funds more frequently or waiting to transfer funds until a large amount was ready to be transferred (thus potentially receiving a better spread). An employee, on the other hand, might transfer money to an international creditor or service provider on a regular basis, such as to pay for a mortgage or to pay for a cell phone, and might not be interested in seeing detailed transaction information.

The request for transfer may also be made in the currency of the prepaid cardholder account held by the prepaid cardholder account owner. For example, a prepaid cardholder could indicate that she would like to send 200 USD to a recipient in Euros. Any fees required for the transaction could be subtracted and the spot exchange rate (plus any required spread) would be used to determine the number of Euros that could be purchased and provided to the recipient. As before, the level of information provided the prepaid cardholder could vary, depending on preferences, from simply indicating the number of Euros that could be sent to a detailed breakdown of the costs associated with the transaction.

Figure 5:
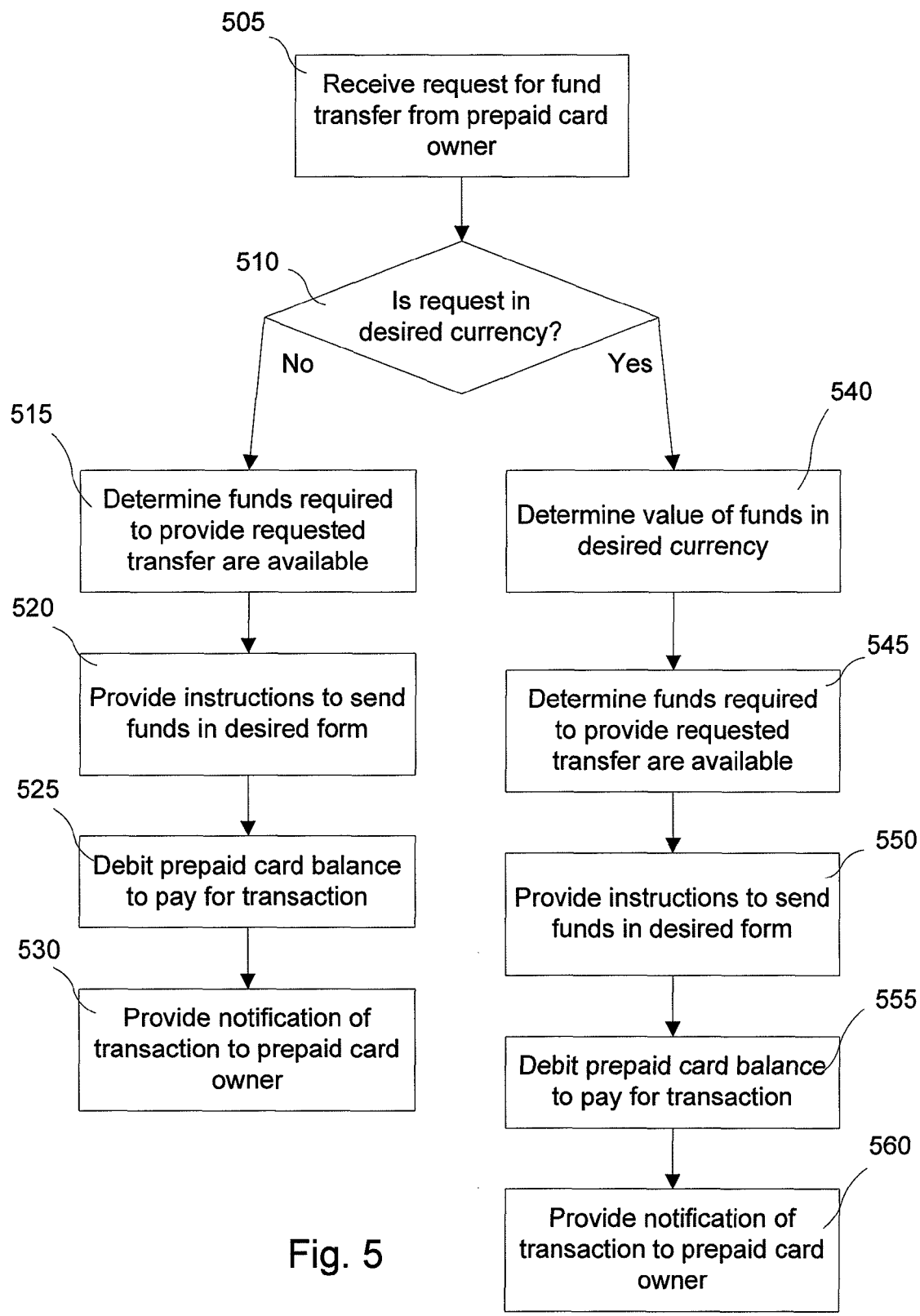
FIG. 5 illustrates a process that includes steps to address two methods of requesting a transfer of funds to a recipient.

Step 340 includes the step of determining whether the amount requested exists in the prepaid card balance. FIG. 5 illustrates the additional process step of checking to see whether the prepaid card account has sufficient stored value, as discussed above. In step 505, a request to transfer funds to a recipient is received. A rectification is made to see if the request is stated in the desired currency (the currency being provided to the recipient). If the request is not, then steps 515, 520, 525 and 530 are carried out, assuming the prepaid cardholder account has sufficient funds. Thus, a simple inquiry may verify whether the prepaid cardholder account has sufficient funds (in the above example, that the prepaid cardholder account has 200 USD). In contrast, if the request is stated in the recipient's currency, then steps 540, 545, 550, 555 and 560 are carried out. Thus, an additional step of determining the appropriate amount to debit from the prepaid cardholder account must first be done, before it can be determined whether the total required funds are available on the prepaid card account. However, because the value of the requested transfer in a foreign currency can automatically be determined, it becomes possible to automatically determine the total required funds and therefore to allow such requests to be processed remotely and automatically (for example, via the Internet). Furthermore, because the currency exchanger is sufficiently global it can continue to function around the clock, thus providing a substantially real time currency exchange rate 24 hours a day. This, in turn, allows a prepaid cardholder to access a prepaid cardholder account and transfer funds in various currencies 24 hours a day, without the need to interface with a human being. As can be appreciated, in a global economy with a large variation of times zones, such flexibility can be beneficial for business and consumers alike.

Once the costs are determined, a check in step 340 (FIG. 3) can be made to see if the prepaid cardholder has a sufficient balance in the prepaid cardholder account to fund the request. If there are insufficient funds, then in step 350 the request is denied. The prepaid cardholder could then select a different amount to transfer to the recipient, or could transfer additional funds into the prepaid cardholder account so as to pay for the requested transfer. For example, a prepaid cardholder might want to transfer a precise amount to a recipient to pay for a service or to make a payment on a debt. However, the prepaid cardholder might have underestimated the amount of funds required because of a change in the currency exchange rate. The prepaid cardholder would then have the choice of either making the payment in a different manner or adding additional funds into the prepaid cardholder account to allow the requested transaction to be processed. This process of increasing available funds in the prepaid cardholder account may then require the cardholder to again initialize the request, or may result in an automatic completion of the transaction when the account manager is informed of an increase in available funds.

However, if there are sufficient funds in the account, then, in step 360, the desired amount (in the desired currency) is sent in the requested manner to the recipient. At approximately the same time that the transfer in the desired currency takes place, funds can be debited from the prepaid cardholder account of the prepaid cardholder in step 370.

Figure 4:
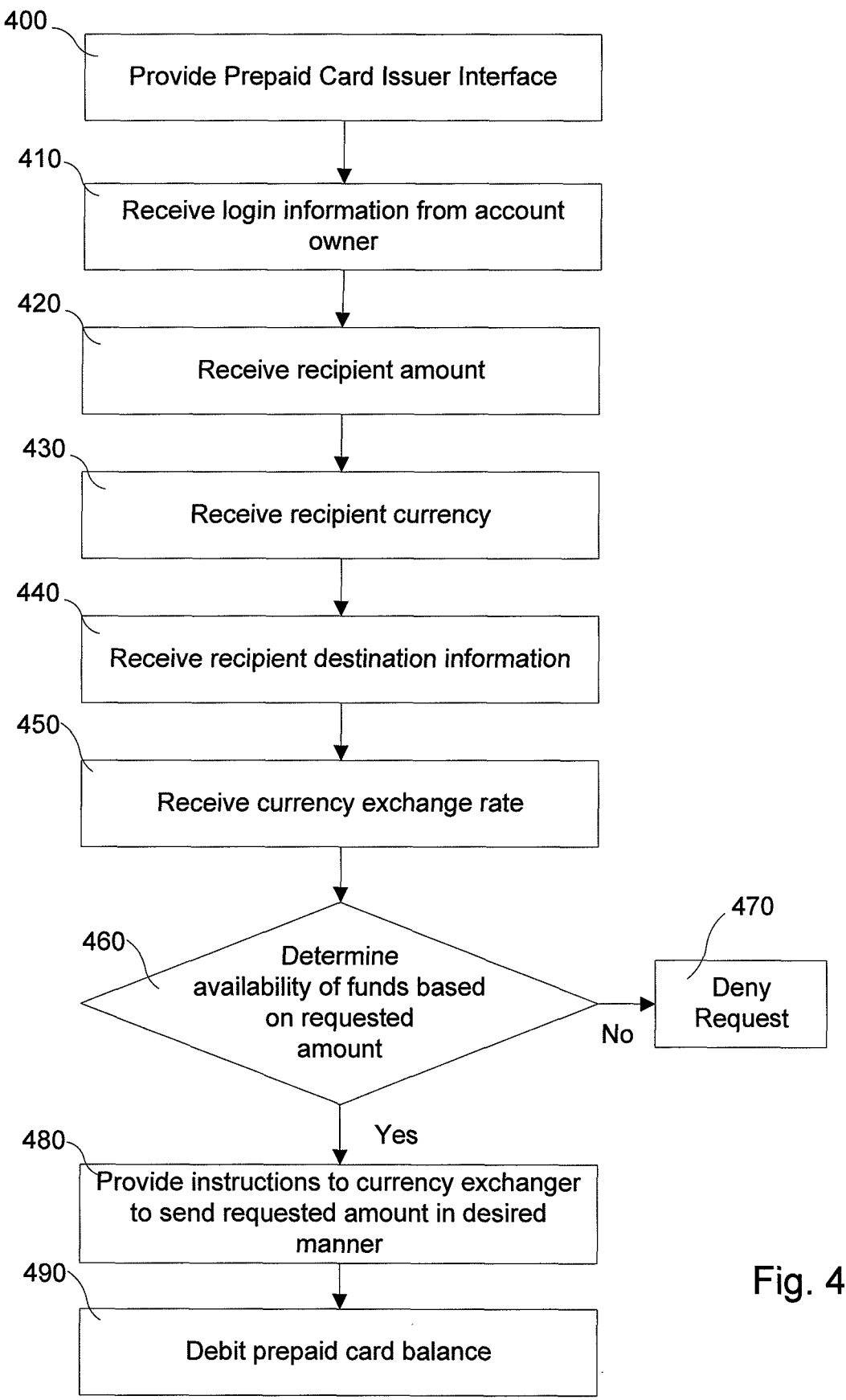
FIG. 4 illustrates a process to assist a user in transferring funds to a recipient.

FIG. 4 illustrates a process similar to that which is described in FIG. 3, focusing on the actions of the prepaid card program manager. First, an interface 400 is provided and login information from the prepaid cardholder is received 410. This information is compared with the appropriate data to verify the person seeking access is authorized to access the prepaid account. This step also may be used to identify the appropriate prepaid account(s). As is known, the process of user verification can include transmission of encrypted information in a conventional manner.

Once the prepaid cardholder is verified, the prepaid cardholder can make a request to transfer funds in a desired currency to a recipient. Thus, in steps 420, 430, 440 the information regarding the currency and the recipient are received. As noted above, the information can be received in a variety of formats and can be based in the currency being provided to the recipient or it can be based on the currency in the account. Furthermore, some of the information regarding the request may already be known by pre-selected information or options by the prepaid account holder. Thus, if a reoccurring payment of a particular amount in a particular currency was set up to take place on a periodic basis, the prepaid cardholder might simply authorize the sending of the next payment, or might pre-authorize transfer of funds without specific transaction involvement.

Next in step 450, a currency exchange rate is received based on the request. As noted above, the received currency exchange rate can include a spread charged by the currency exchanger, which may vary based on the amount being exchanged.

Next in step 460, a determination of whether there are sufficient funds in the prepaid cardholder account is made. This determination is simplified if the individual simply wants to spend, for example 200 USD to send as many Euros as possible to a recipient (the check is whether the prepaid cardholder balance is at least 200 USD). It should be noted that such a verification function may be completed before the currency exchange rate is received. However, if the person wants to send 212.34 Euros to a recipient by bank draft, for example, an inquiry must first be made to determine the currency exchange rate (factoring in any applicable buffering increase or "spread"), and then the cost of sending the bank draft is also determined. The total cost to send the desired amount in the desired manner to the desired recipient can then be reliably calculated and, once complete, verification is made to determine if the prepaid cardholder account is sufficient to cover the transaction requested.

In step 470, if the prepaid cardholder account lacks sufficient funds, the request may be denied. If, however, the prepaid cardholder account includes sufficient funds then in step 480, instructions are provided to the currency exchanger to provide the requested amount in the requested manner to the requested recipient. Next in step 490, the prepaid cardholder account is debited. It should be noted that the prepaid cardholder account may be debited before the instructions are provided to the currency exchanger, substantially in conjunction with the providing of instructions to the currency exchanger, or after the instructions are provided to the currency exchanger. In an embodiment, the prepaid cardholder account is debited in a sufficiently timely manner so as to totally avoid or mitigate the risk of funds being removed from the prepaid cardholder account after the instructions to make the transfer are provided but before the funds are debited from the account.

Naturally, the debiting of the prepaid cardholder account in 490 may include the provision of a statement to the recipient detailing the transaction. In an embodiment the statement is only provided electronically so as to minimize attempts to send a paper document to an individually that is unable or unwilling to receive such paper. This has the benefit of reducing costs, and also allows the parties to conserve resources that would otherwise be wasted by traditional document transactions.

Figure 6:
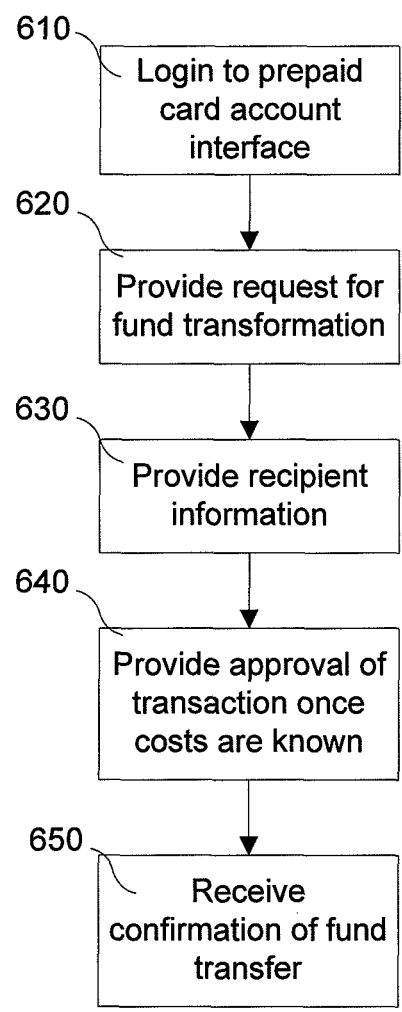
FIG. 6 illustrates a process that may be taken by a user to transfer funds to a recipient.

While FIGS. 3 through 5 illustrate exemplary process steps taken by the prepaid card program manager and/or currency exchanger, FIG. 6 illustrates the process of making a request from the prepaid cardholder account owner's perspective. First in step 610, the prepaid cardholder logs into the prepaid card account interface. This is preferably an Internet-based interface whereby the cardholder provides login information and thereby is provided access to the prepaid card balance and other interface for functions according to the procedures described herein. In this aspect of the embodiment, as with other aspects described herein, the term "account" is not intended to indicate a bank account and instead is merely indicative of the prepaid card balance and related information, which may also include recent transactional history and/or pending request information. The prepaid cardholder provides information for log-in and/or verification in an appropriate manner, such as entering login information at a web-site interface, preferably as a user id and password submitted through the webpage as shown in login 700 in FIG. 7. If biometric data is used, the login can include the proffering of the biometric data along with user identification information (thus providing a desired two-factor authorization of something the prepaid cardholder knows and something the prepaid cardholder has). Once the prepaid cardholder account owner's identity is verified, the prepaid cardholder can be provided a home page 800 (see FIG. 8) that allows the prepaid cardholder to view prior transactions and select the tasks the prepaid cardholder would like to perform. While other layouts may be used, preferably the selection of the exchange services will be available on a first level of the home page so the user can quickly and easily make the desired request.

Next, in step 620, a request is made to transfer funds to a recipient. As noted above, the request can be a new request to a new recipient in a new manner, or it may be a repeat of a prior request or a transaction relating to installment payments or variable payment on scheduled dates. If it is a new recipient, then in step 630 the recipient's information will be provided. Alternatively, if the recipient's information is known or otherwise obtained, then required action (such as depicted in step 630) may be omitted.

In step 640, the prepaid cardholder provides approval for the transaction. Because the currency exchange rate changes continuously, the cost associated with the requested transfer of the foreign currency will change. Therefore, the approval step allows the prepaid cardholder to review the financial costs and determine whether the transaction should be done based on the current exchange rate. In addition, the requirement for an additional approval in step 640 helps prevent inadvertent transfers of funds to recipients. Preferably the method of providing approval involves performing a different action then the action required to make initial request. For example, if a button a web page is pressed to make the initial selection, a button in a different location can be used to provide the final authorization, thus minimizing the chance that the user authorizes the payment in spite of an unexpected, unfavorable change in the exchange rate.

Once approval is provided, the prepaid cardholder receives confirmation that the fund transfer is going to happen. The confirmation may include the spot exchange rate, the effective exchange rate (e.g., the rate the prepaid cardholder received once all the costs were taken into account), as well as an estimate of the date the recipient will receive the funds. Email notification of the transfer may also be provided. In an embodiment, the email notification may be provided to a prepaid cardholder and the recipient, however, in certain embodiments it may be sufficient to simply update the list of prior transactions and include the transaction a periodic statement.

In one embodiment, the prepaid cardholders may approve a transfer of funds to a recipient, such that the cardholder will decide when the currency exchange is performed, thus selecting the exchange rate. In an alternative embodiment, such as an example whereby a recipient also has an account with the prepaid account manager, the recipient may be given the opportunity to elect when the funds are converted to a preselected currency, or to specify a different currency. In this alternate embodiment, the prepaid cardholder authorizes payment in a selected currency, and the account manager transfers the selected funds to the designated recipient's stored-value account. The recipient may be given the control of selecting the actual date for exchanging such funds into another currency and/or select the currency desired. Alternatively, the recipient may have pre-selected a rule or criteria with the account owner and/or the account manager, such as with instructions given by a recipient for currency exchange in the event a threshold rate is available.

In an example of such an arrangement whereby the recipient is given the opportunity to control the fund currency conversion, Company A may be the pre-paid cardholder, as the account owner of a stored-value account with a bank or similar entity being the account manager. Company A may contract with others, such as Company B, for payment of funds, such as funds collected by Company A on behalf of Company B. By pre-arranged preferences and/or contract provisions, Company B may specify that transfer of funds from Company A are either automatically exchanged into a pre-selected currency, are later exchanged into a given currency when approval is given, or are exchanged into a given currency if the spot exchange rate is at a threshold level. Company A may be, or may not be, involved with the determination of when the currency exchange occurs. For example, Company A may merely provide notice to Company B that funds will be transferred to Company B's stored-value account, thus giving Company B the opportunity (as the recipient) to determine the appropriate currency and date for exchange of funds to such currency.

It should be noted that various additional steps may be added and one or more of the depicted steps may be removed, depending on what is desired and the level of integration of the various nodes (see FIG. 1). A process may be the combination of a number of steps depicted in FIGS. 3-6. Thus, unless otherwise indicated, the features depicted in the above description may be combined in a number of different variations.

A significant aspect of the present invention is the versatility of using a prepaid card account to effectively transfer funds globally. This includes usefulness for global companies to provide reward or rebate amounts to customers, provide payments to vendors or suppliers, as well as providing employees payroll funds while utilizing prepaid card account functionality. Further, the steps of the procedures disclosed in the Figures and the description herein describes an apparatus, or financial system, involving communication interface with a network of computers. Such a financial system for transfer of funds includes an interface for a prepaid account owner to access information and to provide a request for a transfer of funds from the prepaid card account to another in a selected currency. The system further includes a computer that calculates the appropriate amount to be transferred from the prepaid card balance to the recipient, inclusive of the currency exchange and any spread or other costs that result form the requested transfer. The requested transfer of funds is then completed and the prepaid cardholder is notified of the completed transaction.

The above description provides preferred and exemplary embodiments. Numerous other embodiments, modifications and variations within the scope and spirit of the appended claims will occur to persons of ordinary skill in the art from a review of this disclosure.

I claim:

1. A computer-implemented method for authenticating a prepaid account holder using biometric information and providing a draft to a recipient in a foreign currency, the method comprising:
    (a) receiving over a network at a prepaid account provider node, a login request from a prepaid account owner node operated by the prepaid account holder, wherein said prepaid account provider node comprises a server having a network interface, a central processing unit, and a computer memory, wherein said login request comprises a two factor verification process including receiving biometric information and a pass code from the prepaid account holder, wherein said prepaid account owner node comprises a computer having a network interface, a central processing unit, and a computer memory, and wherein the prepaid account holder has previously purchased a prepaid card thereby creating a prepaid card account containing funds in the domestic currency;
    (b) verifying, by said prepaid account provider node, the identity of said prepaid account holder, wherein said verifying step includes executing on the central processing unit of said prepaid account provider node one or more instructions stored in the computer memory of said prepaid account provider node, and wherein said verifying step includes comparing the biometric information received in step (a) with biometric information stored in the computer memory of said prepaid account provider node;
    (c) transmitting, by said prepaid account provider node, home web page data over said network to the prepaid account owner node, wherein said home web page data comprises a list of prior transactions for said prepaid card account and a list of actions that may be performed by said prepaid account holder, said list of actions including activating a prepaid card, viewing a statement of activity, viewing a prepaid card account balance, or exchanging currencies;
    (d) receiving over the network at the prepaid account provider node, a payment request from the prepaid account owner node for a draft payment to the recipient in the foreign currency, wherein the name and address of the recipient were previously stored in the memory of the prepaid account provider node, wherein the payment request includes a threshold rate for currency exchange, and wherein the payment request does not contain the name or address of the recipient;
    (e) transmitting, by said prepaid account provider node, a currency exchange request over said network to a currency exchanger node, wherein the currency exchange request includes the identities of the domestic currency and the foreign currency and a request amount in said domestic currency or said foreign currency, and wherein the currency exchanger node comprises a server having a network interface, a central processing unit, and a computer memory;
    (f) receiving over the network at the prepaid account provider node, a currency exchange rate from the currency exchanger node, wherein said currency exchange rate includes a delivery charge fee;
    (g) comparing, by said prepaid account provider node, the currency exchange rate to the threshold rate;
    (h) if said comparing of step (g) indicates that said currency exchange rate is worse than said threshold rate, transmitting, by said prepaid account provider node, a message over said network to said prepaid account owner node indicating that the currency exchange rate is worse than the threshold rate and that no currency transaction has taken place;
    (i) if said comparing of step (g) indicates that said currency exchange rate is equal to or better than said threshold rate, verifying, by said prepaid account provider node, that the prepaid card account contains sufficient funds to cover the payment request using the currency exchange rate;
    (j) if the verification of step (i) confirms that the prepaid card account contains sufficient funds to cover the payment request using the currency exchange rate, performing the steps comprising:
        i) transmitting, by said prepaid account provider node, a draft request over the network to said currency exchanger node, wherein said draft request includes the name and address of the recipient, and wherein the draft request includes the request amount and the identities of the domestic currency and the foreign currency,
        ii) receiving over the network at the prepaid account provider node, a confirmation message from the currency exchanger node that the draft request will be fulfilled by the currency exchanger node,
        iii) debiting, by the prepaid account provider node, funds from the prepaid card account to cover the payment request,
        iv) transferring, by the prepaid account provider node, funds to the currency exchanger node in said domestic currency, and
        v) sending, by said currency exchanger node, a draft to the recipient in the foreign currency; and
    (k) if the verification of step (i) indicates that the prepaid card account does not contain sufficient funds to cover the payment request using the currency exchange rate, transmitting, by said prepaid account provider node, a message over said network to said prepaid account owner node indicating that the prepaid card account lacks sufficient funds to cover the payment request and that no currency transaction has taken place;

wherein the prepaid account provider node, the currency exchanger node, and the prepaid account owner node do not perform any risk management calculations.

2. The method of claim 1 wherein the draft is sent to the recipient by mail at the address identified in step (j), sub-step (i).

3. The method of claim 1 wherein the prepaid card is a general spend prepaid card.

4. The method of claim 1 wherein the prepaid card is a corporate reward prepaid card.

5. The method of claim 1 wherein the prepaid card is a payroll card.

6. The method of claim 1 wherein the prepaid card is a gift card.

7. The method of claim 1 wherein the prepaid card is a tangible card.

8. The method of claim 1 wherein the prepaid card is a virtual card.

9. The method of claim 1 wherein the prepaid card is a stored-value card.

10. The method of claim 1 wherein the payment request of step (d) is a request for periodic payments such that steps (e) through (k) are periodically performed by the prepaid account provider node without further receipt of a payment request from the prepaid account owner node.

11. A system for authenticating a prepaid account holder using biometric information and providing a draft to a recipient in a foreign currency, the system comprising:

a prepaid account provider node comprising a server having a network interface, a central processing unit, and a computer memory;

a prepaid account owner node comprising a computer having a network interface, a central processing unit, and a computer memory;

a currency exchanger node comprising a server having a network interface, a central processing unit, and a computer memory;

a network connecting said prepaid account provider node, said prepaid account owner node, and said currency exchanger node; and a prepaid card;

wherein the prepaid card has previously been purchased by a prepaid account holder thereby creating a prepaid card account containing funds in a domestic currency;

wherein the central processing unit of said prepaid account provider node is programmed to:

(a) receive over the network a login request from the prepaid account owner node operated by the prepaid account holder, wherein said login request comprises a two factor verification process including receiving biometric information and a pass code from the prepaid account holder;

(b) verify the identity of said prepaid account holder, including comparing the biometric information received from the prepaid account owner node with biometric information stored in the computer memory of said prepaid account provider node;

(c) transmit home web page data over said network to the prepaid account owner node, wherein said home web page data comprises a list of prior transactions for said prepaid card account and a list of actions that may be performed by said prepaid account holder, said list of actions including activating a prepaid card, viewing a statement of activity, viewing a prepaid card account balance, or exchanging currencies;

(d) receive over the network a payment request from the prepaid account owner node for a draft payment to the recipient in the foreign currency, wherein the name and address of the recipient were previously stored in the memory of the prepaid account provider node, wherein the payment request includes a threshold rate for currency exchange, and wherein the payment request does not contain the name or address of the recipient;

(e) transmit a currency exchange request over said network to the currency exchanger node, wherein the currency exchange request includes the identities of the domestic currency and the foreign currency and a request amount in said domestic currency or said foreign currency;

(f) receive over the network a currency exchange rate from the currency exchanger node, wherein said currency exchange rate includes a delivery charge fee;

(g) compare the currency exchange rate to the threshold rate;

(h) if said comparing of step (g) indicates that said currency exchange rate is worse than said threshold rate, transmit a message over said network to said prepaid account owner node indicating that the currency exchange rate is worse than the threshold rate and that no currency transaction has taken place;

(i) if said comparing of step (g) indicates that said currency exchange rate is equal to or better than said threshold rate, verify that the prepaid card account contains sufficient funds to cover the payment request using the currency exchange rate;

(j) if the verification of step (i) confirms that the prepaid card account contains sufficient funds to cover the payment request using the currency exchange rate, perform the steps comprising:

i) transmit a draft request over the network to said currency exchanger node, wherein said draft request includes the name and address of the recipient, and wherein the draft request includes the request amount and the identities of the domestic currency and the foreign currency, ii) receive over the network a confirmation message from the currency exchanger node that the draft request will be fulfilled by the currency exchanger node, iii) debit funds from the prepaid card account to cover the payment request, iv) transfer funds to the currency exchanger node in said domestic currency, and v) receive a confirmation message from the currency exchanger node that a draft in the foreign currency has been sent to the recipient; and (k) if the verification of step (i) indicates that the prepaid card account does not contain sufficient funds to cover the payment request using the currency exchange rate, transmit a message over said network to said prepaid account owner node indicating that the prepaid card account lacks sufficient funds to cover the payment request and that no currency transaction has taken place; and wherein the prepaid account provider node, the currency exchanger node, and the prepaid account owner node do not perform any risk management calculations.

12. The system of claim 11 wherein the draft is sent to the recipient by mail at the address identified in step (j), sub-step (i).

13. The system of claim 11 wherein the prepaid card is a general spend prepaid card.

14. The system of claim 11 wherein the prepaid card is a corporate reward prepaid card.

15. The system of claim 11 wherein the prepaid card is a payroll card.

16. The system of claim 11 wherein the prepaid card is a gift card.

17. The system of claim 11 wherein the prepaid card is a tangible card.

18. The system of claim 11 wherein the prepaid card is a virtual card.

19. The system of claim 11 wherein the prepaid card is a stored-value card.

20. The system of claim 11 wherein the payment request of step (d) is a request for periodic payments such that steps (e) through (k) are periodically performed by the prepaid account provider node without further receipt of a payment request from the prepaid account owner node.

* * * * *